(12) United States Patent
Li et al.

(10) Patent No.: US 11,314,520 B2
(45) Date of Patent: Apr. 26, 2022

(54) METHOD AND CONTROL TERMINAL FOR CONFIGURING BASIC INPUT/OUTPUT SYSTEM SETTINGS OF A COMPUTER

(71) Applicant: Mitac Computing Technology Corporation, Taoyuan (TW)

(72) Inventors: Jyun-Hong Li, Taoyuan (TW); Chi-Hao Kuan, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 359 days.

(21) Appl. No.: 16/747,252

(22) Filed: Jan. 20, 2020

(65) Prior Publication Data
US 2020/0241884 A1    Jul. 30, 2020

(30) Foreign Application Priority Data
Jan. 30, 2019 (TW) ................... 108103563

(51) Int. Cl.
| | |
|---|---|
| *G06F 9/4401* | (2018.01) |
| *G06F 9/445* | (2018.01) |
| *G06F 9/451* | (2018.01) |
| *G06F 3/0489* | (2022.01) |
| *G06F 9/54* | (2006.01) |
| *G06F 8/65* | (2018.01) |

(52) U.S. Cl.
CPC .......... *G06F 9/4401* (2013.01); *G06F 3/0489* (2013.01); *G06F 8/65* (2013.01); *G06F 9/44505* (2013.01); *G06F 9/451* (2018.02); *G06F 9/542* (2013.01); *G06F 9/546* (2013.01)

(58) Field of Classification Search
CPC .... G06F 9/4401; G06F 9/44505; G06F 9/451; G06F 9/546; G06F 9/452; G06F 9/4451; G06F 9/44521; G06F 9/44552; G06F 9/44563; G06F 9/44578
See application file for complete search history.

(56) References Cited

U.S. PATENT DOCUMENTS

| | | | |
|---|---|---|---|
| 9,710,284 B1 * | 7/2017 | Huang | ................. G06F 9/4403 |
| 2007/0255936 A1 * | 11/2007 | Stemen | ................. G06F 9/4411 |
| | | | 713/2 |
| 2015/0169330 A1 * | 6/2015 | Maity | ..................... G06F 8/654 |
| | | | 713/1 |
| 2021/0034377 A1 * | 2/2021 | Martin | ............... G06Q 20/1085 |

* cited by examiner

*Primary Examiner* — Raymond N Phan
(74) *Attorney, Agent, or Firm* — MLO, a professional corp.

(57) ABSTRACT

A method is implemented by a control terminal communicable with a computer, and includes: receiving a modification request, obtaining a configuration path that contains a target option name of a target option to be modified and a target page name of a target page; obtaining a current page name of a current page presented in a current setup screen of BIOS of the computer; transmitting a control instruction to the computer so as to enable the computer to switch contents presented in the current setup screen from the current page to the target page, and to change option selection from a current option to the target option; and transmitting a modification instruction to the computer so as to enable the computer to modify the target option to have a target configuration value.

20 Claims, 10 Drawing Sheets

METHOD AND CONTROL TERMINAL FOR CONFIGURING BASIC INPUT/OUTPUT SYSTEM SETTINGS OF A COMPUTER

CROSS-REFERENCE TO RELATED APPLICATION

This application claims priority of Taiwanese Invention Patent Application No. 108103563, filed on Jan. 30, 2019.

FIELD

The disclosure relates to a method for configuring basic input/output system (BIOS) settings of a computer, and more particularly to a method for automatically configuring BIOS settings of a computer by utilizing a control terminal communicable with the computer.

BACKGROUND

Conventionally, a user usually adjusts basic input/output system (BIOS) settings of a computer by directly interacting with an interface (e.g., a display and/or a keyboard) of the computer at a location of the computer. Some remote control mechanisms, such as console redirection or serial over LAN (SOL), provide a setup screen for the BIOS of the computer to a user who is located at a remote location so as to allow the user to manually adjust BIOS settings of the computer from the remote location based on the setup screen thus provided. However, such remote user has to read the information displayed on the setup screen in person, and manually perform operation on the setup screen based on the information thus read so as to remotely adjust BIOS settings of the computer. Therefore, the aforementioned conventional approaches of adjusting the BIOS settings of the computer by hand are still inconvenient for a user, especially when BIOS settings of multiple computers are to be configured. Unable to concurrently configure the BIOS settings of multiple computers, the user has to configure these settings one computer after another. The conventional approaches are not only inefficient and time-consuming, but also troublesome and mistake-prone.

SUMMARY

Therefore, an object of the disclosure is to provide a method for configuring basic input/output system (BIOS) settings of a computer that can alleviate at least one of the drawbacks of the prior art.

According to one aspect of the disclosure, the method is adapted to be implemented by a control terminal communicable with the computer. The method includes steps of:

A) receiving a modification request that contains a target option name of a target option to be modified in the BIOS settings and a target configuration value corresponding to the target option, and obtaining a configuration path that contains the target option name and a target page name of a target page where the target option is located;

B) in response to receipt of an entry of serial data that is related to a current setup screen of BIOS of the computer, obtaining, based on the entry of serial data, a current page name of a current page presented in the current setup screen;

C) transmitting a control instruction to the computer based on the current page name and the configuration path so as to enable the computer to switch contents presented in the current setup screen of the BIOS of the computer from the current page to the target page, and to change option selection from a current option to the target option; and D) transmitting a modification instruction that contains the target configuration value to the computer so as to enable the computer to modify the target option of the BIOS settings to have the target configuration value.

According to another aspect of the disclosure, the control terminal is adapted to configure BIOS settings of a computer, is communicable with the computer, and is configured to:

receive a modification request that contains a target option name of a target option to be modified in the BIOS settings and a target configuration value corresponding to the target option, and obtain a configuration path that contains the target option name and a target page name of a target page where the target option is located;

in response to receipt of an entry of serial data that is related to a current setup screen of BIOS of the computer, obtain, based on the entry of serial data, a current page name of a current page presented in the current setup screen;

transmit a control instruction to the computer based on the current page name and the configuration path so as to enable the computer to switch contents presented in the current setup screen of the BIOS of the computer from the current page to the target page, and to change option selection from a current option to the target option; and transmit a modification instruction that contains the target configuration value to the computer so as to enable the computer to modify the target option of the BIOS settings to have the target configuration value.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
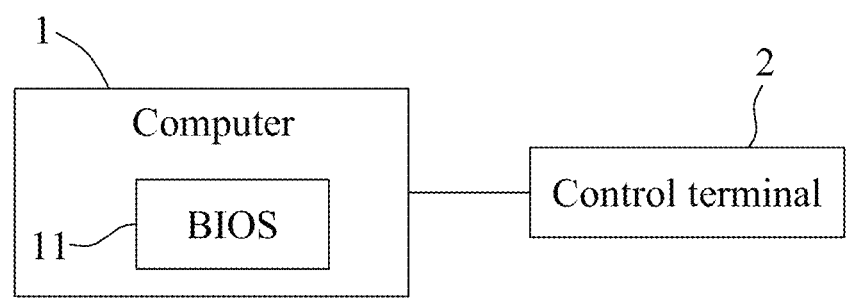
FIG. 1 is a block diagram illustrating an embodiment of a system that includes a control terminal which is adapted to implement a method for configuring basic input/output system (BIOS) settings of a computer according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system according to the disclosure is illustrated. The system includes a computer 1 having basic input/output system (BIOS) 11, and a control terminal 2 communicable with the computer 1. The communication between the computer 1 and the control terminal 2 may be conducted over a wired connection or through wireless transmission. The control terminal 2 is utilized to implement a method for configuring BIOS settings of a computer according to the disclosure.

When the function of console redirection of the computer 1 is enabled, the computer 1 continuously transmits to the control terminal 2 a stream of serial data that is related to a screen displayed by the computer 1, such as a power on self test (POST) screen of the computer 1 or a setup screen of the BIOS 11 of the computer 1 (referred to as "the BIOS setup screen" hereinafter). It should be noted that the console redirection allows a user to maintain certain aspects of a server or a computer from a remote location by re-directing keyboard input and text output through a serial port. In addition, the computer 1 executes a console application program so as to modify the BIOS settings of the computer 1 according to instructions coming from the control terminal 2. Each entry of the serial data in the stream contains a plurality of strings and a plurality of control codes respectively corresponding to the strings. Each of the control codes contains position information and text-color information. The position information indicates a position on the screen where the corresponding one of the strings is located. The text-color information indicates a text color of the corresponding one of the strings presented in the screen.

For example, an entry of serial data "ESC[5;1HESC[1;37;47m Memory Voltage" represents that a string "Memory Voltage" is located at row 5, column 1 of the screen, and that the string "Memory Voltage" presented in the screen is colored in bright white on a gray background. A portion of the control code "ESC[5;1H" is the position information, wherein "5" corresponds to row 5, and "1" corresponds to column 1. Another portion of the control code "ESC[1;37;47m" is the text-color information, wherein "1;37;47" corresponds to bright white text on a gray background.

Each of the computer 1 and the control terminal 2 may be implemented to be a desktop computer, a laptop computer, a notebook computer, a tablet computer or a server, but implementation thereof is not limited to what are disclosed herein and may vary in other embodiments. In this embodiment, the control terminal 2 keeps receiving the stream of serial data from the computer 1 via a USB-to-RS232 adapter (also known as a USB to serial converter) connected between a USB port of the control terminal 2 and an RS232 serial port of the computer 1. However, how data transmission is carried out between the computer 1 and the control terminal 2 is not limited to the disclosure herein and may vary in other embodiments.

The control terminal 2 receives a modification request made by a user. Based on the serial data received from the computer 1 and the modification request, the control terminal 2 automatically transmits instructions to the computer 1 for controlling the computer 1 to modify the BIOS settings of the computer 1. In some embodiments, the control terminal 2 is communicable with multiple computers 1 at the same time, and is capable of controlling each of the computers 1 to modify the BIOS settings thereof. Since implementation of procedures to configure the BIOS settings of each computer 1 is similar, the number of the computer 1 is exemplified to be one for brevity and clarity.

In order to modify the BIOS settings of the computer 1, the computer 1 must be operated to enter a setup utility of the BIOS and to provide the BIOS setup screen first. Since the method for configuring BIOS settings of a computer according to the disclosure is intended to allow the control terminal 2 to control the computer 1 to modify the BIOS settings in a fully automatic way, the control terminal 2 must also control the computer 1 to enter the setup utility of the BIOS automatically.

The method according to the disclosure includes a BIOS setup entrance procedure for entering the setup utility of the BIOS and for automatically requesting provision of the BIOS setup screen, and a BIOS setup modification procedure for automatically modifying a target option of the BIOS settings to have a target configuration value after the BIOS setup screen is provided. The control terminal 2 is configured to execute an application program including a plurality of computer executable instructions for implementing the BIOS setup entrance procedure and the BIOS setup modification procedure.

Figure 2:
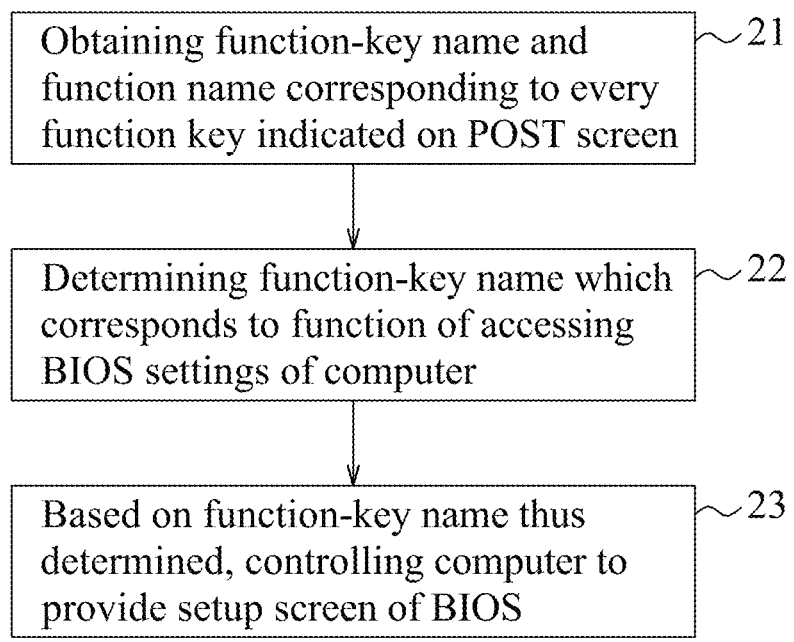
FIG. 2 is a flow chart illustrating an embodiment of a procedure for accessing the BIOS settings of the computer.

Referring to FIGS. 1 and 2, an embodiment of the BIOS setup entrance procedure is illustrated, and includes steps 21 to 23 described as follows.

Figure 3:
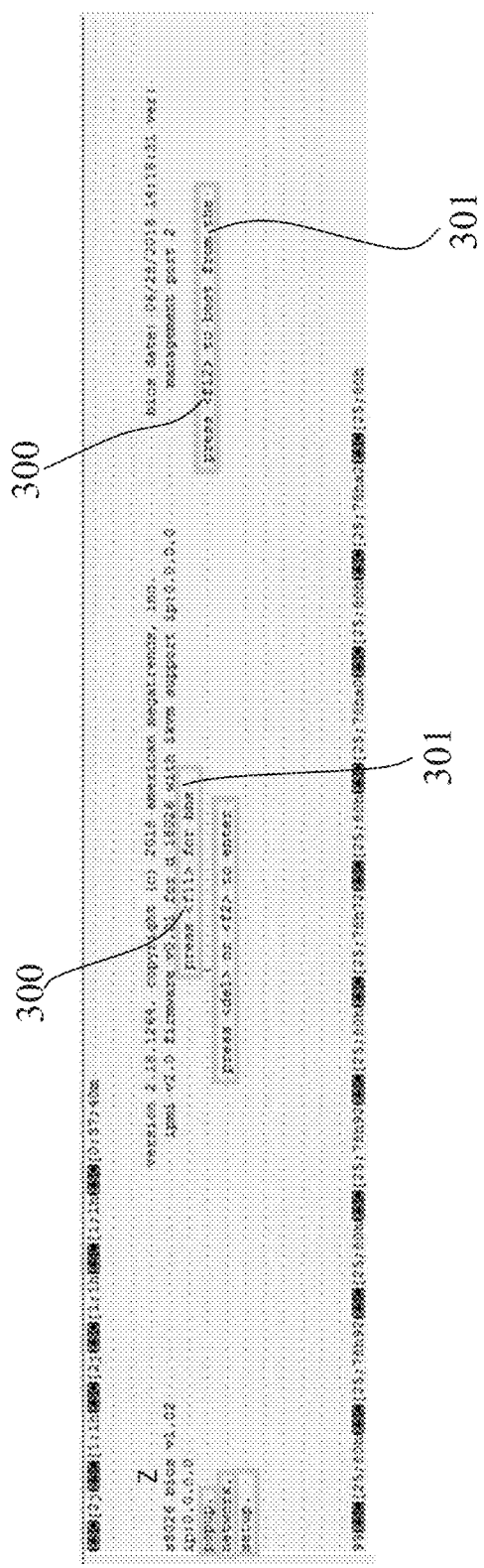
FIG. 3 is a schematic diagram illustrating an embodiment of serial data that is related to a power on self test (POST) screen of the computer.

In step 21, in response to receipt of an entry of serial data that is related to the POST screen of the computer 1 (see FIG. 3, the entry of serial data may be related to function-key names 300 of function keys, function names 301 of functions corresponding to the function keys, and colors and/or positions of text of the function-key names 300 and the function names 301 indicated on the POST screen), the control terminal 2 obtains, based on the entry of serial data, the function-key name 300 of each function key indicated on the POST screen and the function name(s) 301 of the function(s) corresponding to the function key(s) indicated on the POST screen.

Figure 4:
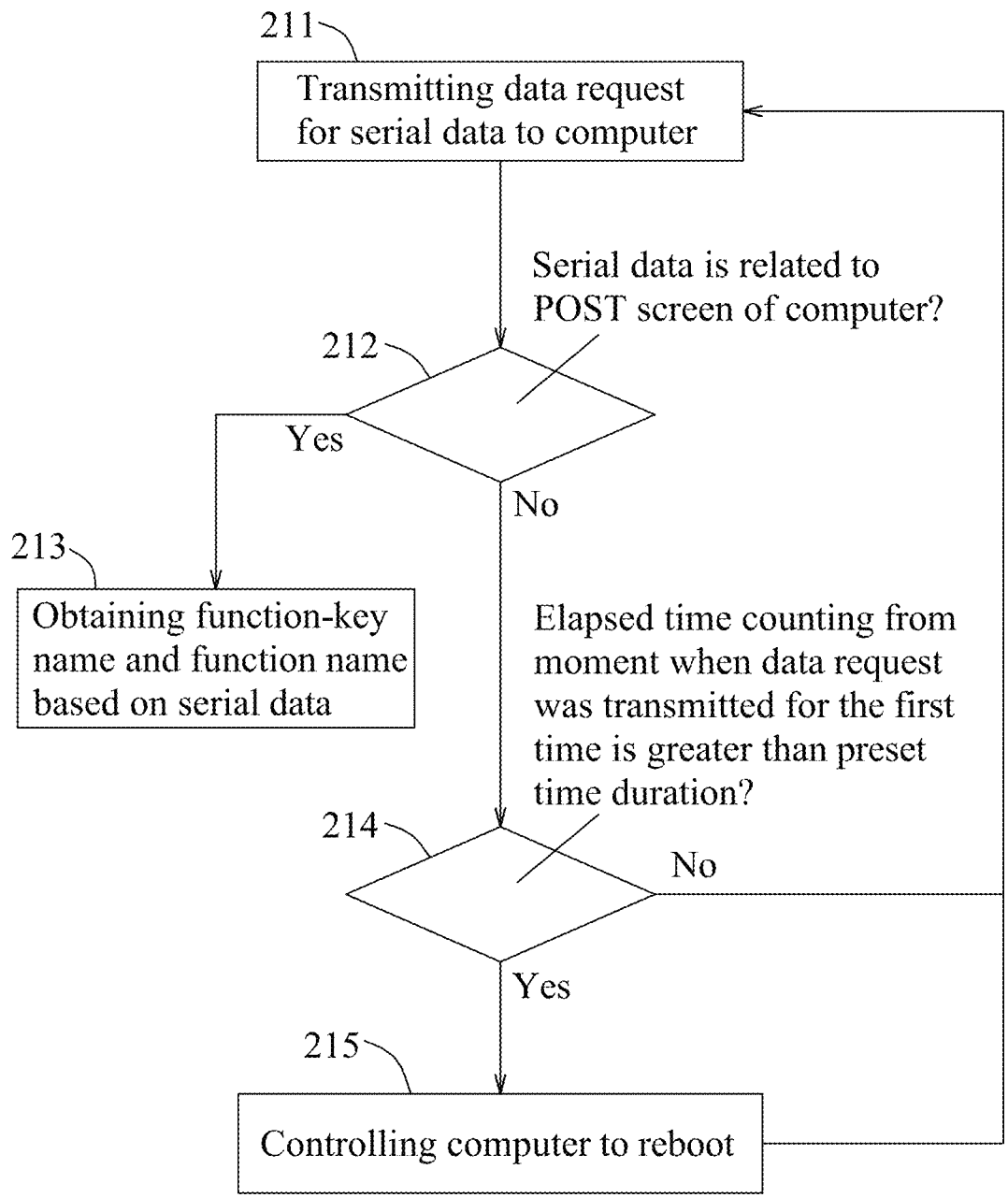
FIG. 4 is a flow chart illustrating an embodiment of a procedure for collecting function-key names and function names that are presented on the POST screen of the computer.

Referring to FIGS. 1 and 4, step 21 includes sub-steps 211 to 215 outlined below.

In sub-step 211, the control terminal 2 periodically transmits to the computer 1 a data request for an entry of serial data that is related to the screen displayed by the computer 1. In response to the data request, the computer 1 returns a current entry of serial data to the control terminal 2, where the current entry of serial data is related to the screen currently being displayed by the computer 1.

In sub-step 212, with respect to each data request, in response to receipt of an entry of serial data transmitted by the computer 1 according to the data request, the control terminal 2 determines whether the entry of serial data is related to the POST screen of the computer 1. When it is determined that the entry of serial data is related to the POST screen of the computer 1, a flow of procedure of the method proceeds to sub-step 213. Otherwise, when it is determined that the entry of serial data is not related to the POST screen of the computer 1, the flow of procedure of the method proceeds to sub-step 214. In this embodiment, the control terminal 2 determines whether the entry of serial data is related to the POST screen of the computer 1 by determining whether the entry of serial data contains a specific text string, such as "Setup", "BBS POPUP" or "Boot from network", but the approach to determining whether the entry of serial data is related to the POST screen of the computer 1 is not limited thereto.

In sub-step 213, the control terminal 2 obtains each of the function-key names 300 and each of the function names 301 contained in the entry of the serial data. Specifically speaking, for each function-key name 300 recited in the entry of serial data that is related to the POST screen, the control terminal 2 determines a matched string that recites the function name 301 of the function corresponding to the function-key name 300 by using regular expression (regex), and obtains the function name 301 corresponding to the function-key name 300 based on the matched string. In this embodiment, the regular expression used to search for the matched string that recites the function name 301 is exemplified by the following form:

"(?<='+HotKey+'>)[\s\w< >]+", wherein "HotKey" represents the function-key name 300, and may be "F1", "F2", "F3", . . . , "F12", "DEL" or the like. The function-key names 300 and the corresponding function names 301 are exemplarily listed in Table 1 below.

TABLE 1

| Function-key name | Function name |
|---|---|
| F2 | Setup |
| F11 | BBS POPUP |
| F12 | Boot from network |

In sub-step 214, the control terminal 2 determines whether elapsed time counting from a moment when the data request was transmitted for the first time is greater than a preset time duration (e.g., 10 minutes). When it is determined that the elapsed time is greater than the preset time duration, the flow of procedure of the method proceeds to sub-step 215. Otherwise, when it is determined that the elapsed time is not greater than the preset time duration, the flow of procedure of the method goes back to sub-step 211.

In sub-step 215, the control terminal 2 transmits a reset instruction to the computer 1 so as to enable the computer 1 to reboot. The flow of procedure of the method then goes back to sub-step 211.

Referring back to FIGS. 1 and 2, in step 22, the control terminal 2 determines, based on the function names 301 obtained in step 21, the function-key name 300 which corresponds to the function of accessing the BIOS settings of the computer 1 (i.e., entering the setup utility). In this embodiment, the control terminal 2 determines the function-key name 300 which corresponds to the function of accessing the BIOS settings of the computer 1 by finding out the function-key name corresponding to the function name expressed in a text string with the term "Setup".

In step 23, the control terminal 2 transmits, based on the function-key name 300 thus determined and to the computer 1, a control input that is related to the function key to which the function-key name 300 corresponds so as to enable the computer 1 to access the BIOS settings (i.e., enter the setup utility) and to provide the BIOS setup screen for further automatic configuration of the BIOS settings of the computer 1.

Figure 5:
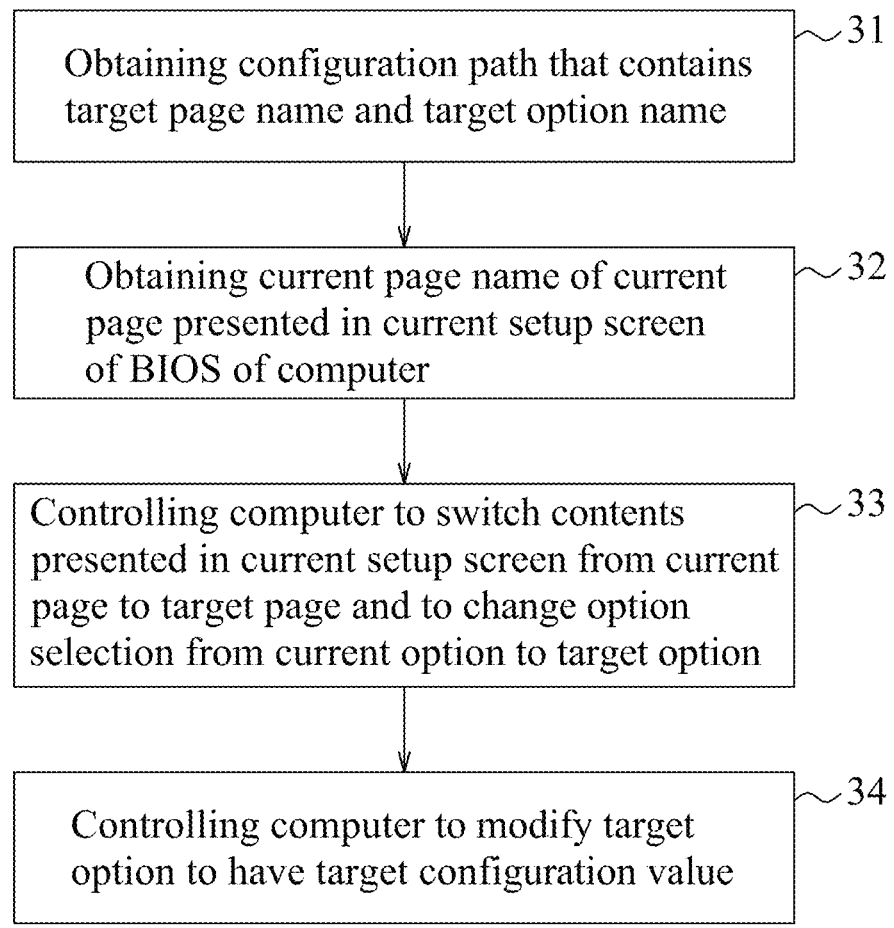
FIG. 5 is a flow chart illustrating a first embodiment of a BIOS setup modification procedure of the method according to the disclosure.

This disclosure will introduce, inter alia, two embodiments of the BIOS setup modification procedure. Referring to FIGS. 1 and 5, the first embodiment of the BIOS setup modification procedure is illustrated, and includes steps 31 to 34 outlined below.

In step 31, based on a modification request that contains a target option name of a target option to be modified in the BIOS settings, a target page name of a target page where the target option is located, and a target configuration value corresponding to the target option, the control terminal 2 obtains a configuration path that contains the target page name and the target option name. In this embodiment, the modification request is generated by the control terminal 2 according to a user data input to the control terminal 2. That is to say, the target option name, the target page name and the target configuration value contained in the modification request are assigned by the user. Then, the control terminal 2 automatically performs the BIOS setup modification procedure based on the modification request thus generated.

In one embodiment, the modification request is generated by an electronic device that is connected via a communication network to the control terminal 2, and after generating the modification request, the electronic device transmits the modification request via the communication network to the control terminal 2. In this case, the modification request is generated by the electronic device according to a user data input to the electronic device. The electronic device may be implemented to be a desktop computer, a laptop computer, a notebook computer, a tablet computer or a server, but implementation thereof is not limited to what are disclosed herein and may vary in other embodiments.

It is worth to note that in this embodiment, generation of the modification request is implemented with the assistance of a known software tool called TestLink, and the modification request is implemented to contain a single test case, which is a document relating to a test function of the TestLink and containing the target option name, the target page name and the target configuration value. However, in other embodiments, the modification request may be implemented to contain multiple test cases, where each of the test cases corresponds to a combination of a respective target option name, a respective target page name and a respective target configuration value. In this way, separate modifications of the BIOS settings may be performed at the same time.

Figure 6:
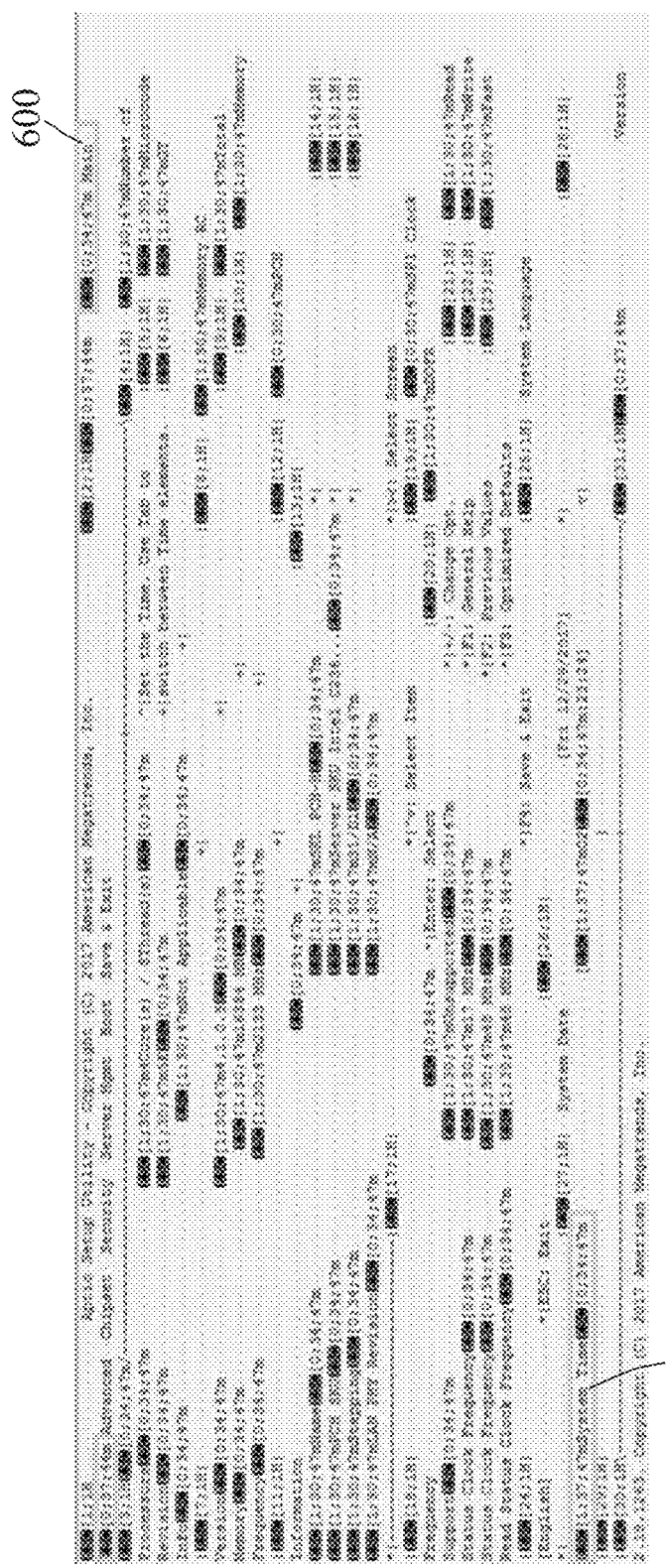
FIG. 6 is a schematic diagram illustrating an embodiment of serial data that is related to a setup screen of BIOS of the computer.

In step 32, in response to receipt of an entry of serial data (see FIG. 6) that is related to a current BIOS setup screen of the computer 1, the control terminal 2 obtains, based on the entry of serial data, a current page name 600 (e.g., "Main" in FIG. 6) of a current page presented in the current BIOS setup screen. Specifically speaking, the control terminal 2 determines in the entry of serial data, a matched string that is related to the current page by using regex, and obtains the current page name 600 of the current page based on the matched string. In this embodiment, the regular expression used to search for the matched string that is related to the current page is exemplified by the following form:

"\x1b[0;34;47m(.+)\x1b[0;37;44m", wherein "[0;34;47m" corresponds to blue text on a gray background. Since the current page name of the current page is marked with blue text on a gray background in the current BIOS setup screen of the computer 1, the current page name 600 can be identified based on the text following "[0;34;47m" in the matched string.

In step 33, based on the current page name and the configuration path, the control terminal 2 transmits a control instruction to the computer 1 so as to enable the computer 1 to switch contents presented in the current BIOS setup screen of the computer 1 from the current page to the target page, and to change option selection on the current page presented in the current BIOS setup screen from a current option to the target option.

Figure 7:
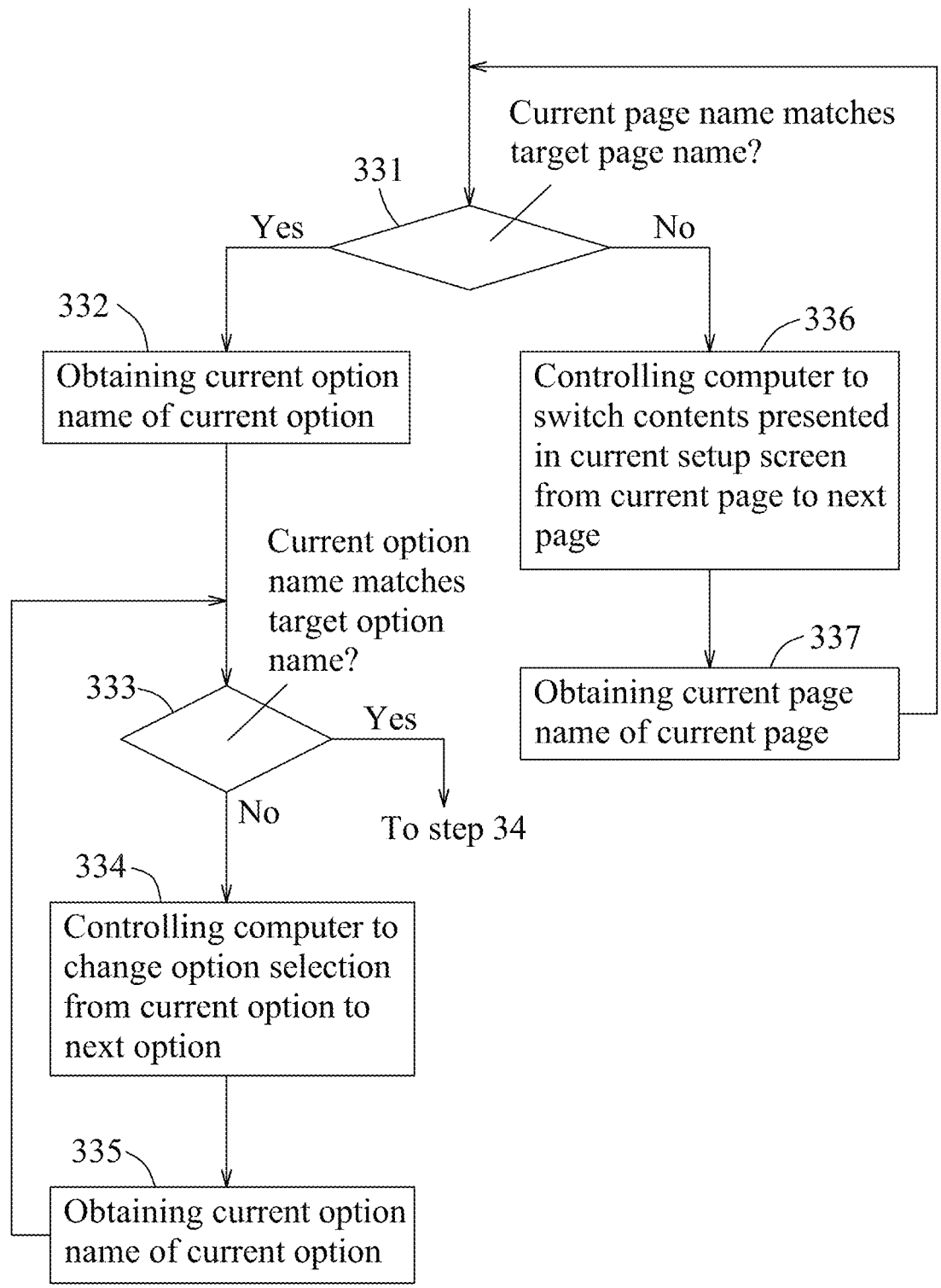
FIG. 7 is a flow chart illustrating an embodiment of a procedure for transmitting a control instruction to the computer.

Referring to FIGS. 1 and 7, step 33 further includes sub-steps 331 to 337 outlined below.

In sub-step 331, the control terminal 2 determines whether the current page name matches the target page name. When it is determined that the current page name matches the target page name, the flow of procedure of the method proceeds to sub-step 332. Oppositely, when it is determined that the current page name does not match the target page name, the flow of procedure of the method proceeds to sub-step 336.

In sub-step 332, the control terminal 2 obtains a current option name of the current option that is currently being selected on the current page presented in the current BIOS setup screen based on the entry of serial data related to the current BIOS setup screen. Specifically speaking, the control terminal 2 determines, in the entry of serial data, a matched string that is related to the current option by using regex, and obtains the current option name of the current option based on the matched string. Referring to FIG. 6 again, the current option name 601 is exemplified by "System Time". In this embodiment, the regular expression used to search for the matched string that is related to the current option is exemplified by the following form:

"\x1b[1;37;47m(.+)\x1b\[0;34;47m", wherein "[1;37;47m" corresponds to bright white text on a gray background. Since the current option name of the current option is marked with bright white text on a gray background in the current BIOS setup screen of the computer 1, the current option name 601 can be identified based on the text following "[1;37;47m" in the matched string.

In sub-step 333, the control terminal 2 determines whether the current option name matches the target option name. When it is determined that the current option name matches the target option name, the flow of procedure of the method proceeds to step 34, where the current page presented in the current BIOS setup screen is the target page and the current option currently being selected in the target page is the target option. Otherwise, when it is determined that the current option name does not match the target option name, the flow of procedure of the method proceeds to sub-step 334.

In sub-step 334, the control terminal 2 transmits an option-switching instruction to the computer 1 so as to enable the computer 1 to change option selection on the current page presented in the current BIOS setup screen from the current option to a next option. It should be noted that the next option is an option subsequent to the current option in a predetermined sequence of options provided on the current page.

In sub-step 335, based on an entry of serial data related to the current BIOS setup screen in which the current page is presented where the next option in sub-step 334 is currently being selected to serve as the current option, the control terminal 2 obtains a current option name of the current option. Then, the flow of procedure of the method goes back to sub-step 333.

In sub-step 336, the control terminal 2 transmits a page-switching instruction to the computer 1 so as to enable the computer 1 to switch contents presented in the current BIOS setup screen from the current page to a next page. It should be noted that the next page is a page subsequent to the current page in a predetermined sequence of pages provided by the BIOS settings.

In sub-step 337, based on an entry of serial data related to the current BIOS setup screen in which the next page in sub-step 336 is presented to serve as the current page, the control terminal 2 obtains a current page name of the current page. Then, the flow of procedure of the method goes back to sub-step 331. It should be noted that the option-switching instruction described in sub-step 334 and/or the page-switching instruction described in sub-step 336, depending on the actual case, constitute the control instruction described in step 33. Referring back to FIGS. 1 and 5, in step 34, the control terminal 2 transmits a modification instruction that contains the target configuration value to the computer 1 so as to enable the computer 1 to modify the target option of the BIOS settings to have the target configuration value.

Figure 8:
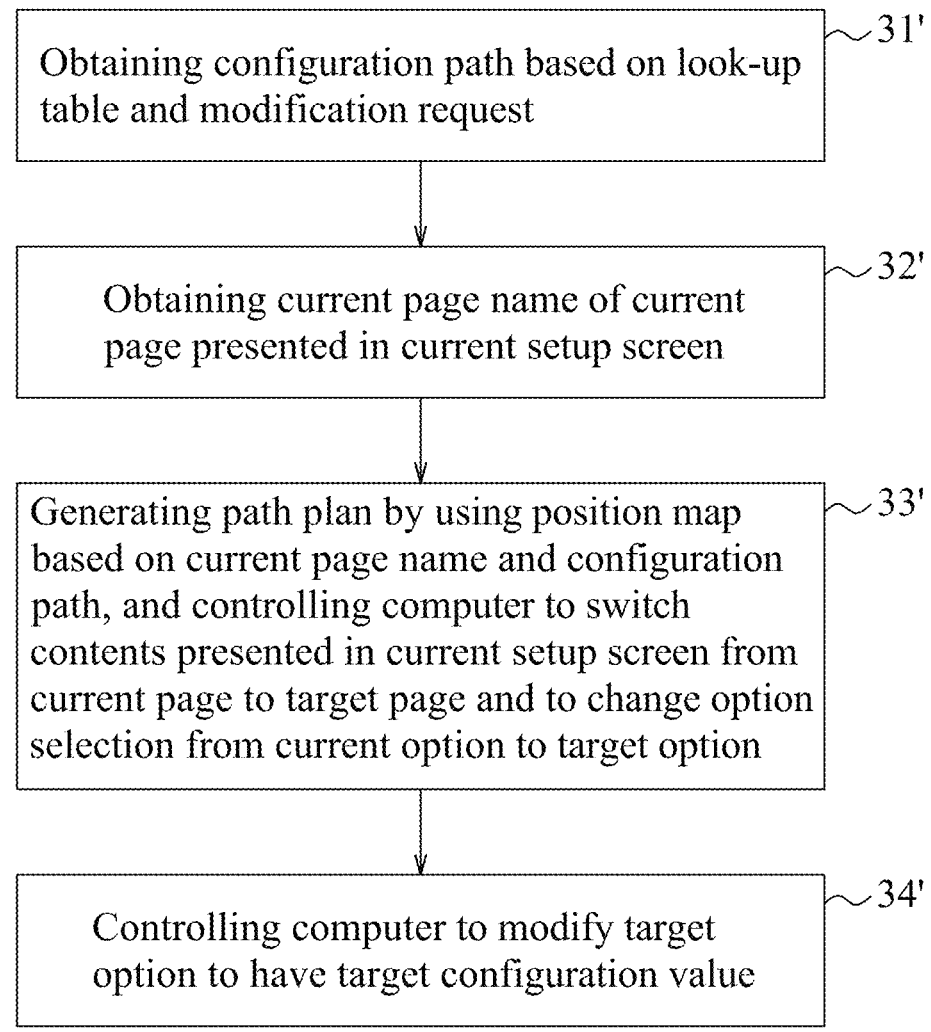
FIG. 8 is a flow chart illustrating a second embodiment of the BIOS setup modification procedure of the method according to the disclosure.

Referring to FIGS. 1 and 8, the second embodiment of the BIOS setup modification procedure is illustrated. Similar to the first embodiment, the second embodiment of the BIOS setup modification procedure includes steps 31' to 34' as shown in FIG. 8. For the sake of brevity and clarity, only the differences between the first and second embodiments will be discussed below.

In step 31', based on a look-up table and a modification request which includes the target option name and the target configuration value, the control terminal 2 obtains the configuration path. The control terminal 2 looks up, in the look-up table, the page name corresponding to the target option that has the target option name contained in the modification request to serve as the target page name for being included in the configuration path so as to obtain the configuration path, which, as mentioned previously, contains the target page name and the target option name. Specifically speaking, the control terminal 2 stores the look-up table in advance. Page names of all pages provided by the BIOS settings of the computer 1, and selectable option names of all options located on any one of the pages are stored in the look-up table. Based on the look-up table, the control terminal 2 determines one of the selectable option names that matches the target option name contained in the modification request, and then determines one of the page names that corresponds to said one of the selectable option names thus determined (i.e., to find out the page name of the page where the option having the target option name is located) to serve as the target page name. For the second embodiment of the BIOS setup modification procedure, the target page name is not required to be contained in the modification request, and is obtainable by referring to the look-up table. Comparatively, for the first embodiment of the BIOS setup modification procedure, both the target page name and the target option name need to be contained in the modification request.

Step 32' of the second embodiment is similar to step 32 of the first embodiment, and will not be described herein.

In step 33', the control terminal 2 generates, by using a position map based on the current page name obtained in step 32' and the configuration path obtained in step 31', a path plan which indicates instructions for switching contents presented in the current BIOS setup screen from the current page to the target page and for selecting the target option. Subsequently, the control terminal 2 transmits the control instruction to the computer 1 based on the path plan so as to enable the computer 1 to switch contents presented in the current BIOS setup screen of the computer 1 from the current page to the target page, and to change option selection from a current option to the target option. Specifically speaking, the control terminal 2 stores the position map in advance. The position map stores the page names, selectable option names corresponding to the pages, page-option positions corresponding respectively to the page names, and option positions corresponding respectively to the selectable option names.

Definitions of the selectable option names, the page-option positions and the option positions will be explained later in this disclosure. Based on the position map, the control terminal 2 is able to assess the minimum required number of times of operation for switching contents presented in the current BIOS setup screen from the current page to any other one of the pages and to select any one of the options. Consequently, the control terminal 2 is capable of generating the path plan which indicates the most efficient instructions for switching (i.e., with the least number of times of page switching to arrive at the target page and the least number of times of option selection changing to arrive at the target option). Compared with the first embodiment of the BIOS setup modification procedure where an approach similar to brute-force search (or called exhaustive search) is used, the second embodiment has an improved efficiency and saves time.

Step 34' of the second embodiment is similar to step 34 of the first embodiment.

It should be noted that the BIOS setup modification procedure may be implemented by combining steps 31, 32 and 34 of the first embodiment and step 33' of the second embodiment, or by combining step 31' of the second embodiment and steps 32 to 34 of the first embodiment.

Compared with the look-up table, the position map further records the page-option positions of all pages provided by the BIOS settings of the computer 1 and the option positions of all options located on corresponding pages. Therefore, the look-up table utilized in step 31' can be replaced by the position map. That is to say, in step 31', the control terminal 2 may obtain the configuration path based on the position map and the target option name contained in the modification request. As a result, the control terminal 2 does not have to store the look-up table if the position map has already been stored therein.

Figure 9:
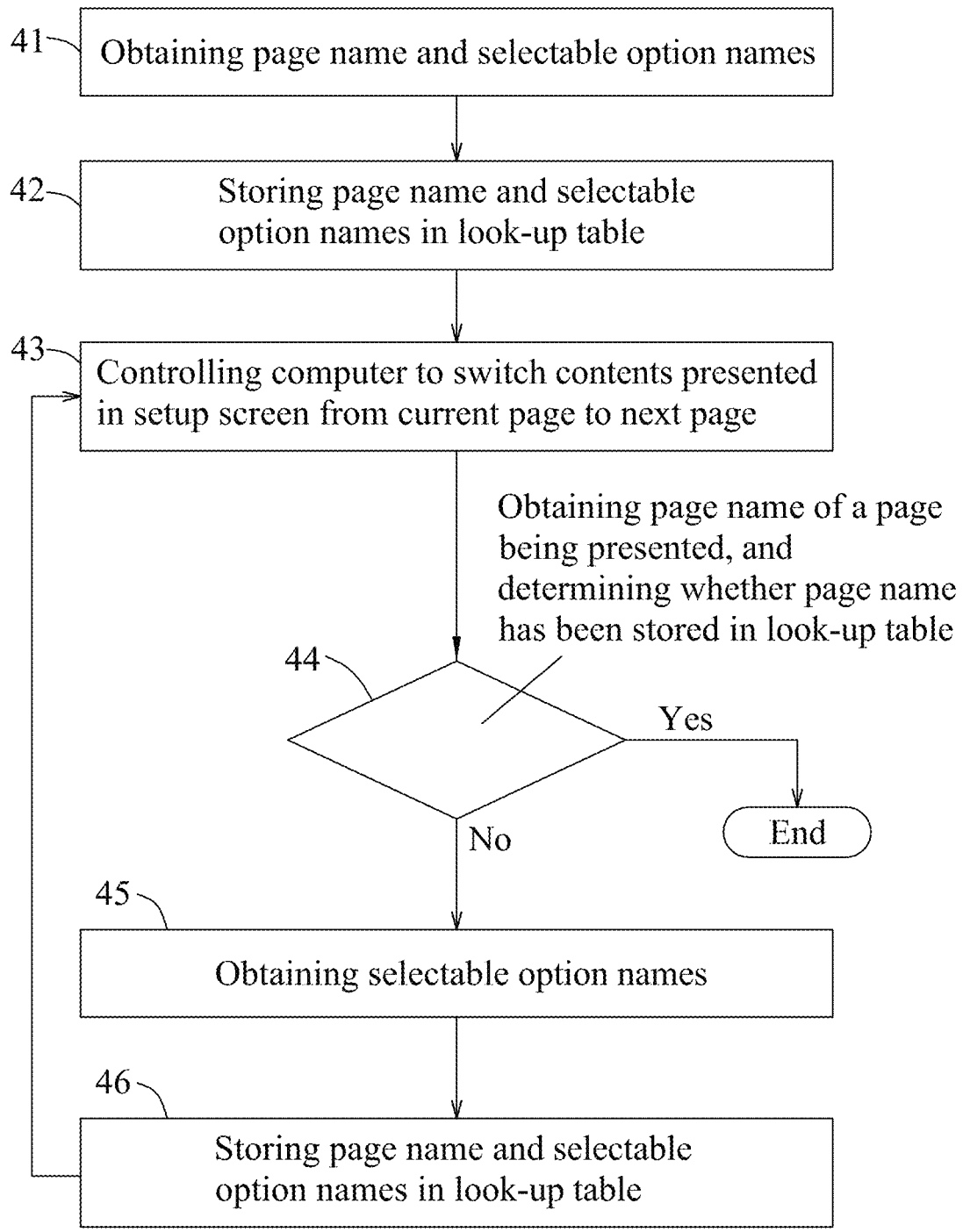
FIG. 9 is a flow chart illustrating an embodiment of a procedure for establishing a look-up table.

Referring to FIGS. 1 and 9, an embodiment of a procedure for establishing the look-up table is illustrated. It is worth to note that in some embodiments, the look-up table is established manually instead of being established by automatic processes such as the procedure for establishing the look-up table disclosed herein. The procedure for establishing the look-up table includes steps 41 to 46 outlined below.

In step 41, based on an entry of serial data that is related to a BIOS setup screen of the computer 1 (referred to as "the BIOS setup screen" hereinafter), the control terminal 2 obtains a page name of a page that is presented in the BIOS setup screen and selectable option names of selectable options that are located on the page and correspond to the page name.

In step 42, the control terminal 2 stores the page name and the selectable option names thus obtained in the look-up table.

In step 43, the control terminal 2 transmits a page-switching instruction to the computer 1 so as to enable the computer 1 to switch contents presented in the BIOS setup screen from the page to a next page.

In step 44, based on another entry of serial data that is related to the BIOS setup screen of the computer 1, the control terminal 2 obtains a page name of a page that is presented in the BIOS setup screen (i.e., the "next" page mentioned in step 43). Then, the control terminal 2 determines whether the page name of the page that is presented in the BIOS setup screen has been stored in the look-up table. When it is determined that the page name of the page that is presented in the BIOS setup screen has been stored in the look-up table, the control terminal 2 determines that establishing the look-up table is completed, and the flow of procedure of the method proceeds to an end. Otherwise, when it is determined that the page name of the page that is presented in the BIOS setup screen has not been stored in the look-up table, the flow of procedure of the method proceeds to step 45.

In step 45, based on said another entry of serial data that is related to the BIOS setup screen of the computer 1, the control terminal 2 obtains selectable option names of selectable options that are located on the page presented in the BIOS setup screen and that correspond to the page name of the page.

In step 46, the control terminal 2 stores the page name obtained in step 44 and the selectable option names obtained in step 45 in the look-up table. Thereafter, the flow of procedure of the method returns to step 43. Performance of steps 43 to 46 is repeated until for each of the pages that are provided by the BIOS, the page name thereof and the selectable option names of the selectable options that are located thereon and that correspond to the page name have been stored in the look-up table.

Figure 10:
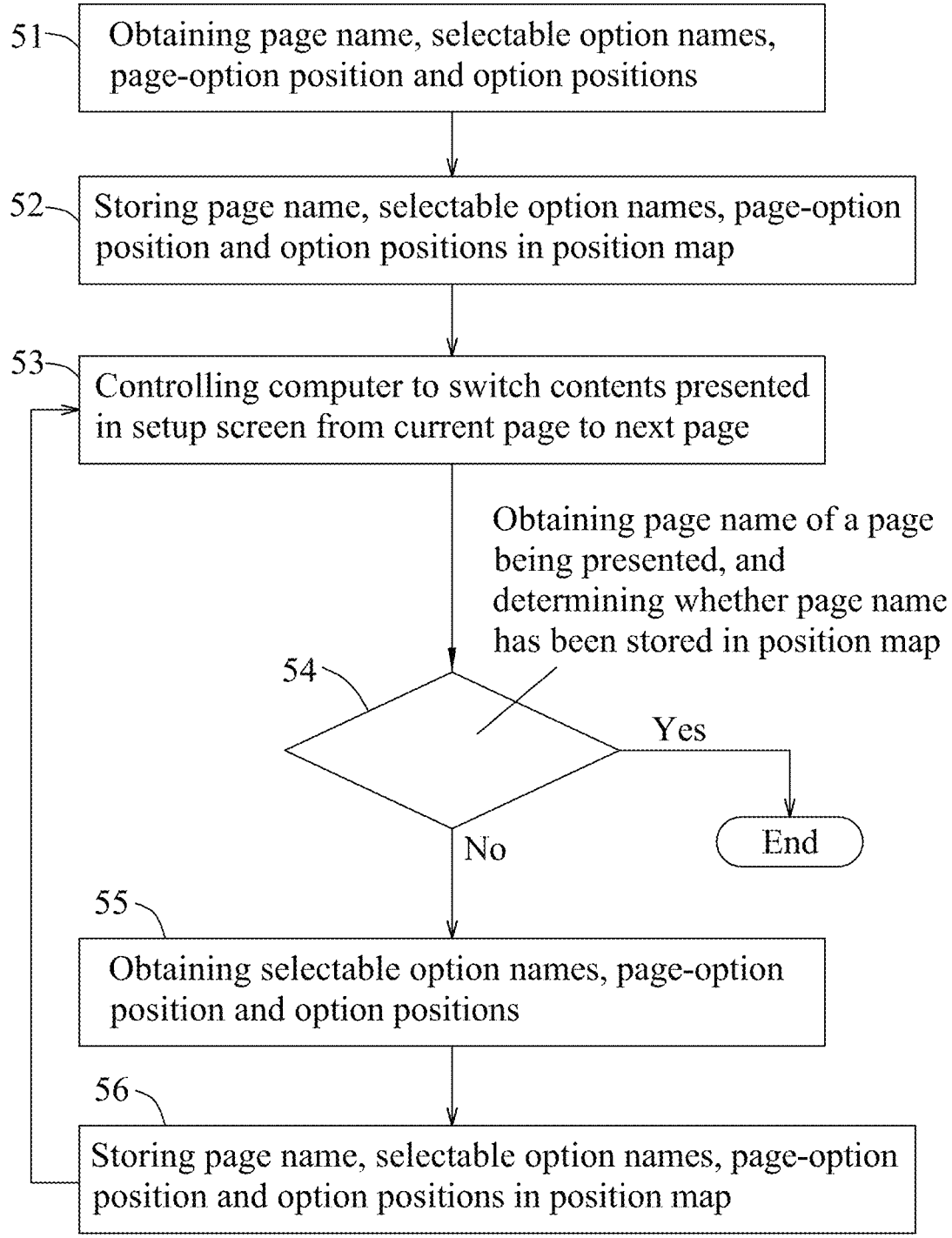
FIG. 10 is a flow chart illustrating an embodiment of a procedure for establishing a position map.

Referring to FIGS. 1 and 10, an embodiment of a procedure for establishing the position map is illustrated. It is worth to note that in some embodiments, the position map is established manually instead of being established by automatic processes such as the procedure for establishing the position map disclosed herein. The procedure for establishing the position map includes steps 51 to 56 outlined below.

In step 51, based on an entry of serial data that is related to a BIOS setup screen of the computer 1 (referred to as "the BIOS setup screen" hereinafter), the control terminal 2 obtains a page name of a page that is presented in the BIOS setup screen, selectable option names of selectable options that are located on the page and that correspond to the page name, a page-option position of a page option that corresponds to the page, and option positions of the selectable options that are located on the page. In this embodiment, the control terminal 2 obtains the page-option position based on the position information contained in the control code that corresponds to the string reciting the page name, and obtains the option positions based on the position information contained in the control codes that correspond respectively to the strings reciting the selectable option names.

In step 52, the control terminal 2 stores the page name, the selectable option names, the page-option position and the option positions in the position map.

In step 53, the control terminal 2 transmits a page-switching instruction to the computer 1 so as to enable the computer 1 to switch contents presented in the BIOS setup screen from the page to a next page.

In step 54, based on another entry of serial data that is related to the BIOS setup screen of the computer 1, the control terminal 2 obtains a page name of a page that is presented in the BIOS setup screen (i.e., the "next" page mentioned in step 53). Then, the control terminal 2 determines whether the page name of the page that is presented in the BIOS setup screen has been stored in the position map. When it is determined that the page name of the page that is presented in the BIOS setup screen has been stored in the position map, the control terminal 2 determines that establishing the position map is completed, and the flow of procedure of the method proceeds to an end. Otherwise, when it is determined that the page name of the page that is presented in the BIOS setup screen has not been stored in the position map, the flow of procedure of the method proceeds to step 55.

In step 55, based on said another entry of serial data that is related to the BIOS setup screen of the computer 1, the control terminal 2 obtains selectable option names of selectable options that are located on the page presented in the BIOS setup screen and that correspond to the page name of the page, a page-option position of a page option that corresponds to the page, and option positions of the selectable options that are located on the page.

In step 56, the control terminal 2 stores in the position map the page name obtained in step 54, and the selectable option names, the page-option position and the option positions that are obtained in step 55. Thereafter, the flow of procedure of the method returns to step 53. Performance of steps 53 to 56 is repeated until, for each of the pages provided by the BIOS, the page name of the page, the selectable option names of the selectable options that are located on the page and that correspond to the page name, the page-option position of the page option corresponding to the page, and the option positions of the selectable options located on the page have been stored in the position map.

In summary, the method according to the disclosure utilizes a control terminal 2 to periodically receive entries of serial data from a computer 1, and to automatically enter the setup utility of the BIOS based on a received entry of serial data for accessing the BIOS settings of the computer 1. Subsequently, the control terminal 2 controls the computer 1 to switch contents presented in a current BIOS setup screen from a current page to a target page and to change option selection from a current option to a target option, and to modify the target option to have a target configuration value. Consequently, automatic control of configuring the BIOS settings from a remote location is realized.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for configuring basic input/output system (BIOS) settings of a computer, to be implemented by a control terminal communicable with the computer, the method comprising:
    A) receiving a modification request that contains a target option name of a target option to be modified in the BIOS settings and a target configuration value corresponding to the target option, and obtaining a configuration path that contains the target option name and a target page name of a target page where the target option is located;
    B) in response to receipt of an entry of serial data that is related to a current setup screen of BIOS of the computer, obtaining, based on the entry of serial data, a current page name of a current page presented in the current setup screen;
    C) transmitting a control instruction to the computer based on the current page name and the configuration path so as to enable the computer to switch contents presented in the current setup screen of the BIOS of the computer from the current page to the target page, and to change option selection from a current option to the target option; and
    D) transmitting a modification instruction that contains the target configuration value to the computer so as to enable the computer to modify the target option of the BIOS settings to have the target configuration value.

2. The method as claimed in claim 1, wherein in step A), the modification request further contains the target page name.

3. The method as claimed in claim 1, prior to step A), further comprising:
    E) obtaining, based on an entry of serial data that is related to any setup screen of the BIOS of the computer, a page name of a page presented in said setup screen, and selectable option names of selectable options located on the page and corresponding to the page name;
    F) storing the page name and the selectable option names obtained in step E) in a look-up table; and
    G) transmitting a page-switching instruction to the computer so as to enable the computer to switch contents presented in said setup screen from the page to a next page, and repeating steps E) to G) until, for all pages provided by the BIOS, the page name of the page, and the selectable option names of the selectable options located on the page and corresponding to the page name of the page have been stored in the look-up table;
    wherein step A) includes looking up, in the look-up table, the page name corresponding to the target option that has the target option name contained in the modification request to serve as the target page name for obtaining the configuration path.

4. The method as claimed in claim 1, wherein step B) includes determining in the entry of serial data, a matched string that is related to the current page by using regular expression (regex), and obtaining the current page name of the current page based on the matched string.

5. The method as claimed in claim 1, wherein step C) further includes sub-steps of:
    C-1) determining whether the current page name matches the target page name;
    C-2) transmitting, when it is determined that the current page name does not match the target page name, a page-switching instruction to the computer so as to enable the computer to switch contents presented in the current setup screen from the current page to a next page;
    C-3) obtaining, based on an entry of serial data related to the current setup screen in which the next page is presented to serve as the current page, a current page name of the current page, and returning to step C-1);
    C-4) obtaining, when it is determined that the current page name matches the target page name, a current option name of the current option that is currently being selected on the current page presented in the current setup screen based on the entry of serial data related to the current setup screen;

C-5) determining whether the current option name matches the target option name;

C-6) transmitting, when it is determined that the current option name does not match the target option name, an option-switching instruction to the computer so as to enable the computer to change option selection from the current option to a next option;

C-7) obtaining, based on an entry of serial data related to the current setup screen in which the current page is presented where the next option is currently being selected to serve as the current option, a current option name of the current option, and returning to step C-5); and C-8) when it is determined that the current option name matches the target option name, performing step D) where the current page is the target page and the current option is the target option.

6. The method as claimed in claim 1, prior to step A), further comprising:

H) obtaining, based on an entry of serial data that is related to a setup screen of BIOS of the computer, a page name of a page presented in said setup screen of the BIOS of the computer, selectable option names of selectable options located on the page and corresponding to the page name, a page-option position of a page option and option positions of the selectable options located on the page presented in said setup screen, where the page option corresponds to the page;

I) storing the page name, the selectable option names, the page-option position and the option positions obtained in step H) in a position map; and J) transmitting a page-switching instruction to the computer so as to enable the computer to switch contents presented in said setup screen from the page to a next page, and repeating steps H) to J) until, for all pages provided by the BIOS, the page name of the page, the selectable option names of the selectable options located on the page and corresponding to the page name of the page, the page-option position of the page option corresponding to the page, and the option positions of the selectable options located on the page have been stored in the position map;

wherein step C) includes generating, by using the position map based on the current page name obtained in step B) and the configuration path, a path plan which indicates instructions for switching contents presented in the current setup screen from the current page to the target page and for selecting the target option, and transmitting the control instruction based on the path plan.

7. The method as claimed in claim 1, prior to step A), further comprising:

K) in response to receipt of an entry of serial data that is related to a power on self test (POST) screen of the computer, obtaining, based on the entry of serial data and for each function key indicated on the POST screen, a function-key name of the function key and a function name of a function corresponding to the function key;

L) determining, based on the function name, the function-key name which corresponds to a function of accessing the BIOS settings of the computer; and M) transmitting, to the computer based on the function-key name thus determined, a control input that is related to the function key to which the function-key name corresponds so as to enable the computer to access the BIOS settings of the computer and to provide the current setup screen of the BIOS.

8. The method as claimed in claim 7, wherein step K) includes for each function-key name recited in the entry of serial data that is related to the POST screen, determining a matched string that recites the function name of the function corresponding to the function-key name by using regular expression (regex), and obtaining the function name corresponding to the function-key name based on the matched string.

9. The method as claimed in claim 7, wherein step K) further includes sub-steps of:

K-1) periodically transmitting to the computer a data request for an entry of serial data that is related to a screen displayed by the computer;

K-2) with respect to each data request, in response to receipt of an entry of serial data transmitted by the computer according to the data request, determining whether the entry of serial data is related to the POST screen of the computer; and K-3) obtaining, when it is determined that the entry of serial data is related to the POST screen of the computer, the function-key name and the function name based on the entry of the serial data.

10. The method as claimed in claim 9, wherein step K) further includes, subsequent to sub-step K-2), sub-steps of:

K-4) determining, when it is determined that the entry of serial data is not related to the POST screen of the computer, whether elapsed time counting from a moment when the data request was transmitted for the first time is greater than a preset time duration;

K-5) transmitting, when it is determined that the elapsed time is greater than the preset time duration, a reset instruction to the computer so as to enable the computer to reboot; and K-6) when it is determined that the elapsed time is not greater than the preset time duration, returning to sub-step K-1).

11. A control terminal adapted to configure basic input/output system (BIOS) settings of a computer, said control terminal being communicable with the computer, and configured to:

receive a modification request that contains a target option name of a target option to be modified in the BIOS settings and a target configuration value corresponding to the target option, and obtain a configuration path that contains the target option name and a target page name of a target page where the target option is located;

in response to receipt of an entry of serial data that is related to a current setup screen of BIOS of the computer, obtain, based on the entry of serial data, a current page name of a current page presented in the current setup screen;

transmit a control instruction to the computer based on the current page name and the configuration path so as to enable the computer to switch contents presented in the current setup screen of the BIOS of the computer from the current page to the target page, and to change option selection from a current option to the target option; and transmit a modification instruction that contains the target configuration value to the computer so as to enable the computer to modify the target option of the BIOS settings to have the target configuration value.

12. The control terminal as claimed in claim 11, wherein the modification request further contains the target page name.

13. The control terminal as claimed in claim 11, wherein said control terminal is further configured to:
  obtain, based on an entry of serial data that is related to a setup screen of the BIOS of the computer, a page name of a page presented in the setup screen, and selectable option names of selectable options located on the page and corresponding to the page name;
  store the page name and the selectable option names in a look-up table; and
  transmit a page-switching instruction to the computer so as to enable the computer to switch contents presented in the setup screen from the page to a next page; and
  wherein said control terminal is configured to look up, in the look-up table, the page name corresponding to the target option that has the target option name contained in the modification request to serve as the target page name for obtaining the configuration path.

14. The control terminal as claimed in claim 11, wherein said control terminal is further configured to determine in the entry of serial data, a matched string that is related to the current page by using regular expression (regex), and obtain the current page name of the current page based on the matched string.

15. The control terminal as claimed in claim 11, wherein said control terminal is further configured to:
  determine whether the current page name matches the target page name;
  transmit, when it is determined that the current page name does not match the target page name, a page-switching instruction to the computer so as to enable the computer to switch contents presented in the current setup screen from the current page to a next page;
  obtain, based on an entry of serial data related to the current setup screen in which the next page is presented to serve as the current page, a current page name of the current page;
  obtain, when it is determined that the current page name matches the target page name, a current option name of the current option that is currently being selected on the current page presented in the current setup screen based on the entry of serial data related to the current setup screen;
  determine whether the current option name matches the target option name;
  transmit, when it is determined that the current option name does not match the target option name, an option-switching instruction to the computer so as to enable the computer to change option selection from the current option to a next option;
  obtain, based on an entry of serial data related to the current setup screen in which the current page is presented where the next option is currently being selected to serve as the current option, a current option name of the current option; and
  when it is determined that the current option name matches the target option name, transmit the modification instruction that contains the target configuration value to the computer so as to enable the computer to modify the target option of the BIOS settings to have the target configuration value, where the current page is the target page and the current option is the target option.

16. The control terminal as claimed in claim 11, wherein said control terminal is further configured to:
  obtain, based on an entry of serial data that is related to a setup screen of BIOS of the computer, a page name of a page presented in the setup screen of the BIOS of the computer, selectable option names of selectable options located on the page and corresponding to the page name, a page-option position of a page option and option positions of the selectable options located on the page presented in the setup screen, where the page option corresponds to the page;
  store the page name, the selectable option names, the page-option position and the option positions in a position map; and
  transmit a page-switching instruction to the computer so as to enable computer to switch contents presented in the setup screen from the page to a next page,
  wherein said control terminal is configured to generate, by using the position map based on the current page name and the configuration path, a path plan which indicates instructions for switching contents presented in the current setup screen from the current page to the target page and for selecting the target option, and transmit the control instruction based on the path plan.

17. The control terminal as claimed in claim 11, wherein said control terminal is further configured to:
  in response to receipt of an entry of serial data that is related to a power on self test (POST) screen of the computer, obtain, based on the entry of serial data and each function key indicated on the POST screen, a function-key name of the function key and a function name of a function corresponding to the function key;
  determine, based on the function name, the function-key name which corresponds to a function of accessing the BIOS settings of the computer; and
  transmit, to the computer based on the function-key name thus determined, a control input that is related to the function key to which the function-key name corresponds so as to enable the computer to access the BIOS settings of the computer and to provide the current setup screen of the BIOS.

18. The control terminal as claimed in claim 17, wherein said control terminal is further configured to, for each function-key name recited in the entry of serial data that is related to the POST screen, determine a matched string that recites the function name of the function corresponding to the function-key name by using regular expression (regex), and obtain the function name corresponding to the function-key name based on the matched string.

19. The control terminal as claimed in claim 17, wherein said control terminal is further configured to:
  periodically transmit to the computer a data request for an entry of serial data that is related to a screen displayed by the computer;
  with respect to each data request, in response to receipt of an entry of serial data transmitted by the computer according to the data request, determine whether the entry of serial data is related to the POST screen of the computer; and
  obtain, when it is determined that the entry of serial data is related to the POST screen of the computer, the function-key name and the function name based on the entry of the serial data.

20. The control terminal as claimed in claim 19, wherein said control terminal is further configured to:
  determine, when it is determined that the entry of serial data is not related to the POST screen of the computer, whether elapsed time counting from a moment when the data request was transmitted for the first time is greater than a preset time duration;

transmit, when it is determined that the elapsed time is greater than the preset time duration, a reset instruction to the computer so as to enable the computer to reboot; and when it is determined that the elapsed time is not greater than the preset time duration, periodically transmit the data request to the computer.

\* \* \* \* \*